Patented July 20, 1954

2,684,383

UNITED STATES PATENT OFFICE 2,684,383

PREPARATION OF SYMMETRICAL TRIAMINOBENZENE COMPOUNDS

John Krueger, West Caldwell, N. J., assignor to Ringwood Chemical Corporation, a corporation of Illinois No Drawing. Application March 28, 1951, Serial No. 218,077

19 Claims. (Cl. 260—575)

My invention relates to the reduction of symmetrical trinitrobenzene and its derivatives and homologues by means of iron and hydrochloric acid to produce the corresponding triamino compounds and their salts.

Relatively little has heretofore been known of the chemistry of the symmetrical triaminobenzene compounds and said compounds have never been adequately characterized. Thus, for example, symmetrical triaminobenzene base itself has been assumed by organic chemists to be non-existent (cf. Beilstein, Handbuch der organischen chemie, vol. XIII, p. 299, Edwards Brothers, Ann Arbor, Michigan). And, although other symmetrical triaminobenzene compounds such as triaminotoluene and triaminophenol have been reported in the chemical literature, they have in the past been prepared only through inconvenient and costly processes such as catalytic hydrogenation or reduction of the corresponding nitro compounds with tin and hydrochloric acid followed by lengthy extraction and purification processes. The attempts that have been made heretofore to make various symmetrical triamino derivatives of benzene through reduction of the symmetrical trinitro compounds with iron have met with indifferent success. In no case has the pure symmetrical triamino compound, or its salt, been actually produced. This is because the chemistry of these symmetrical triaminobenzene compounds has been largely unknown, with the result that the attempts to manufacture the triamino compounds from a corresponding trinitro compound through reduction with iron and mineral acid failed because the conditions required for success were unknown and could not be met.

I have found that symmetrical triaminobenzene and homologous compounds such as 2,4,6-triaminotoluene and 2,4,6-triaminophenol are highly reactive and that their chemical behavior is materially different from the more common aromatic amines, for example, aniline and m-phenylenediamine. Symmetrical triaminobenzenes are extremely reactive and sensitive to oxidizing agents and changes of acidity. I have discovered that symmetrical triaminobenzenes are relatively stable to heat and oxidizing agents, such as nitro compounds and $Fe^{+++}$, when dissolved in solutions of high acidity. In solutions of somewhat lesser acidity, they tend to hydrolyze to hydroxy compounds and at the same time become more sensitive to oxidizing agents. In solutions of still lesser acidity, the tendency towards hydrolysis decreases and the amines tend to condense and polymerize. In solutions of very weak acidity, the amines become stable to hydrolysis but more sensitive to oxidation. In certain pH ranges, they undergo polymerization reactions to produce high molecular-weight products, some of which are resins. They react readily with trinitro compounds, ferric chloride, and other oxidizing substances to produce highly colored end products, some of which are gums and tars.

Symmetrical triaminobenzene and its homologues form hydrochlorides which are stable only in the dry state or in a solution containing a considerable excess of mineral acid. In such a solution they are capable of being boiled for long periods without appreciable hydrolysis. If the dry hydrochlorides are added to a solution containing considerable excess of a strongly alkaline substance such as sodium carbonate or sodium hydroxide in the absence of any oxidizing agent, the pure triamino compound is formed as the free base and can be easily obtained as a solid by extraction with an appropriate solvent. Thus, for example, in accordance with my invention, the hitherto unknown symmetrical triaminobenzene may readily be prepared in the form of a stable white compound. This base melts, when crystallized from acetone-chloroform, at about 84 degrees C. to 86 degrees C., but the compound free from solvent of crystallization melts at approximately 129 degrees C.

Symmetrical triaminobenzene free base and triaminotoluene free base can be easily purified through crystallization from organic solvents and are sufficiently stable toward alkalies so that they may be boiled in dilute caustic soda solutions without decomposition or change. Symmetrical triaminobenzene compounds having substituent groups which will react with alkalies, such as triaminophenol and its homologues, form salts with an excess of alkali which are very easily oxidizable to give highly colored substances and which decompose when their aqueous solution is boiled. Triaminophenol free base is a strong reducing agent and reacts vigorously with atmospheric oxygen. It can be obtained in the pure state only in an inert or reducing atmosphere.

In the light of the peculiar chemical behavior of symmetrical triaminobenzene and its homologous compounds, which I have described above, it is understandable why previous attempts at making them through reduction of the corresponding symmetrical trinitro compounds with iron have been unsatisfactory and of no commercial value. Bielouss, U. S. Patent No. 1,492,094, disclosed reduction of trinitrotoluene with iron in water containing a very small amount of acid and claimed an 89% yield of triaminotoluene. However, the alleged "triaminotoluene" or its hydrochloride was not obtained as the pure substance but that which Bielouss produced and which he asserted was triaminotoluene was described by him as a red-brown amorphous solid without definite melting point. In point of fact, triaminotoluene is a nearly white crystalline material of very definite melting point, namely, 121 degrees C. (cf. Hein and Wagner, Berichte, 68B, 856-64 (1935)).

My invention comprises a process for producing symmetrical triaminobenzene, triaminotoluene, triaminophenol, and other homologous symmetrical triamino derivatives of benzene from their acid salts, and the production of these acid salts through the reduction of trinitrobenzene, trinitrotoluene, trinitrophenol, or other apppropriate symmetrical trinitro compounds with iron and the appropriate acid under certain controlled conditions hereafter described. In the illustrative examples given below, I have, for simplicity, used hydrochloric acid.

In the process of my invention, it is essential, in the first place, that reaction conditions are maintained so that the symmetrical triaminobenzene compound will not be destroyed by oxidation after it is formed. This is done by reacting the symmetrical trinitrobenzene compound with large excesses of both iron and acid over the quantities theoretically required to reduce the symmetrical trinitrobenzene compound. The equation for the reduction of symmetrical trinitrobenzene compounds with iron and hydrochloric acid to produce triaminobenzene compounds involves the use, theoretically, of 9 mols of iron and 18 mols of hydrochloric acid for each mol of symmetrical trinitrobenzene compound

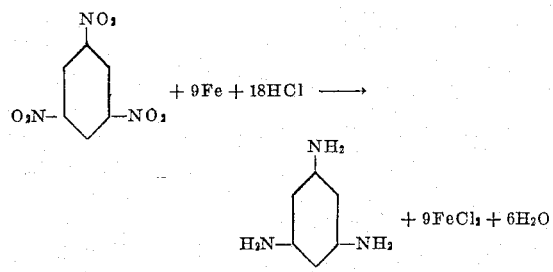

Where sulfuric acid is used, the equation is as follows:

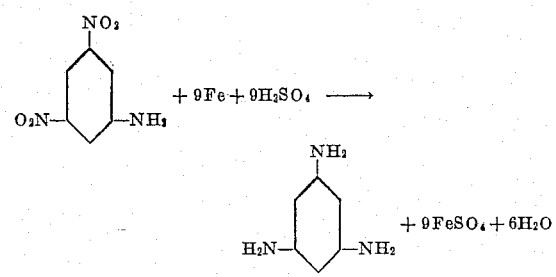

An excess of iron is required, in accordance with my invention, to reduce not only the symmetrical trinitrobenzene compound but, also, to convert the ferric ion which is formed upon the reduction of the nitro groups to ferrous ion. The excess of acid is used not only to assist in the reduction of the nitro groups but, also, to enable the reduction of the ferric ion to ferrous to take place and to stabilize the symmetrical triaminobenzene compound. After all of the symmetrical trinitrobenzene compounds have been reacted, the acidity is maintained while additional quantities of iron are added to remove all remaining traces of oxidizing agents. This complete reduction of these oxidizing agents is indicated by a change in color of the reduction mixture from a brown to a green and by the change in color of the foam from a yellow to a greyish white.

Since the success of my method depends, among other things, upon the maintenance of certain ranges of acidity, it is necessary that the significance of these ranges be understood and, therefore, I set forth below the methods and units of measurement by means of which the limits of the invention may readily be ascertained and controlled.

When the acidity is outside of the range of measurement by means of a standard pH meter, I speak of the acidity as being in the "free acid" range. Since I find the use of hydrochloric acid particularly advantageous in the practice of my invention, I have defined "free acid" as meaning grams of free hydrochloric acid per 100 cc. of solution. When the range of acidity is such that it falls within the range of measurement of a pH meter, I speak of the "pH range."

The free acid is determined by measuring the quantity of 1.0 N-sodium hydroxide solution which must be added to a 25 cc. filtered aliquot of the reduction liquor to produce a permanent turbidity. This is conveniently carried out by pouring the 25 cc. sample into a large beaker, for example, one of about 700 cc. capacity, so that the sample forms a thin layer therein. A bright light is beamed against the bottom of the beaker to facilitate visual determination of the appearance of permanent turbidity. Thereupon, the 1.0 N-sodium hydroxide solution is added gradually with periodic shaking or agitation of the contents of the beaker until, finally, the precipitate no longer dissolves upon vigorous shaking and a permanent turbidity results. The amount of the sodium hydroxide used is calculated in terms of its equivalent of hydrochloric acid (or other acid as the case may be) and this is then translated into grams of acid per 100 cc. of solution.

The pH is measured with a standard pH meter (Leeds and Northrup or Coleman). Since pH meters are least accurate and reliable when measuring ranges of acidity of pH 0.0 to pH 2 (particularly when, as here, the test solutions contain large quantities of dissolved salts), the method of using the instrument and observing the measurement must be standardized. I prefer to calibrate the pH instrument with a standard solution of acid which has a pH in the range of the test solution. It is important, also, to observe and take into account any erratic movement or drift of the indicator of the pH meter.

The use of the above empirical method has permitted me accurately to measure the limits of acidity which define the behavior of the symmetrical triaminobenzene compounds. Symmetrical triaminobenzene compounds are most resistant to oxidizing agents such as ferric ions and nitro groups, do not undergo polymerization, and exhibit the least tendency towards hydrolysis when dissolved in solutions (in the case of hydrochloric acid) of acidity greater than a free acid of approximately 3. Symmetrical triaminobenzene compounds, dissolved in solutions of acidity of a free acid of approximately 3 to an approximate pH of 0.0, exhibit a slight tendency towards hydrolysis to form the corresponding trihydroxybenzene compounds and at the same time become slightly sensitive to oxidizing agents, but do not undergo polymerization. In solutions of acidity of approximately pH 0.0 to pH 2.0, the sensitivity towards oxidation and hydrolysis increases, but, again, polymerization does not take place. The maximum rate of hydrolysis appears to be in the range of pH 0.5 to pH 0.8. If symmetrical triaminobenzene compounds are heated in solutions of acidity of approximate pH of 2 to 5.5, they undergo oxidation, polymerization and condensation reactions. In solutions of weak acidity, pH 5.5 to approximately 7.0, the symmetrical triaminobenzene compounds do not hydrolyze and do not polymerize, but are extremely sensitive to mild oxidizing agents.

It is also essential that the reaction mixture at the end of the process contains a very high concentration of ferrous chloride or other ferrous salt, sufficient to salt out the hydrochloride or other acid salt of the symmetrical triamino compound being produced (for example, triaminobenzene hydrochloride, triaminotoluene hydrochloride, etc.) by reducing the temperature of the reaction mixture, for example, to about 0 degrees C. Usually, the solution at the end of the reduction reaction contains upwards of 28% ferrous salt, for example, ferrous chloride. These triaminobenzene compound salts can be obtained in the pure state by filtering the reaction mixture to remove any sludge and sufficiently cooling the filtrate, whereupon the triaminobenzene compound salts precipitate out and can be removed by filtration and obtained pure through washing with ethanol or methanol to remove any adhering ferrous chloride. The free base can be obtained by treating the triaminobenzene compound salt with an excess of strong alkali, advantageously sodium carbonate, in accordance with the examples set forth below.

When all of the conditions enumerated above are observed, the practice of the process of my invention results in the production of high yields, generally in the range of about 60% to 80%, of symmetrical triaminobenzene compounds, which can readily be recovered from the reaction mixtures containing the same by simple and inexpensive procedures.

The method of the present invention is carried out, in general, by providing a dispersion or mixture of a strong mineral acid, for example, concentrated or commercial hydrochloric acid (Sp. Gr. 1.18) and the symmetrical trinitrobenzene compound, to which mixture particles of iron or powdered iron are added in small quantities and gradually over a period of time. Alternatively, the three reactants may be divided up into a number of equal or substantially equal portions and added, in order, in a reaction vessel. In still another alternative procedure, the acid and the symmetrical trinitrobenzene compound may be added to the reaction vessel and the iron particles added gradually in small amounts over a period of several hours, depending upon the quantities of the reactants utilized. For best results, care should be taken to avoid the building up of local concentration of oxidizing agents as, for example, might occur if large proportions of the symmetrical trinitrobenzene compounds are employed under conditions where the local acidity decreases to a level outside of the critical range. In other words, an excess, and particularly a considerable excess, of powdered iron, should be maintained at all times in the mixture. The symmetrical trinitrobenzene compound is introduced slowly enough so that the amount of trinitro compound, or of ferric chloride (which might be produced through inter-action between the nitro compound and the ferrous chloride in the solution), is at all times small compared to the total amount of reducing substances (iron, nascent hydrogen, and ferrous chloride) present in the mixture. I find it advantageous to use at least 1¼, and, better still, between 1½ and 2½ times the amount of iron necessary to reduce the symmetrical trinitrobenzene compound as calculated on a stoichiometric basis; and most advantageously from 2 to 3 times the stoichiometric quantity of acid. On a molal basis, for each mol of symmetrical trinitrobenzene compound, I prefer to use in the reduction mixture from 10 to 22 mols of iron and from 30 to 60 mols of hydrochloric acid or mol equivalent of other suitable mineral acids, bearing in mind that an excess of acid is maintained throughout the reduction reaction. Generally speaking, depending upon the purity of the iron, a portion thereof may remain unreacted and, in addition, a portion may be converted into a black substance which would appear to be an iron oxide, or a carbide product or the like. The remainder of the iron is converted into the appropriate ferrous salt; for example, ferrous chloride. Of the amount of iron utilized, over 50% is converted to the ferrous salt, for example, ferrous chloride, in the process of my invention.

The term "hydrochlorides" as used herein and in the claims is employed in the generic sense to encompass the products produced pursuant to the present invention whether they be mixtures of hydrochlorides as, for example, the di- and trihydrochlorides, or single hydrochlorides as, for example, the trihydrochloride of the triaminobenzene compound or the hydrate derivative thereof.

The symmetrical triaminobenzene bases which, in the form of their hydrochlorides or other acid salts, can be produced in accordance with the present invention may be represented by the formula herebelow

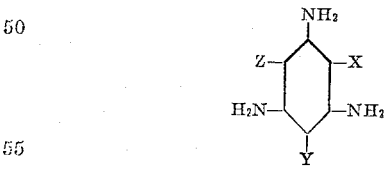

where X, Y and Z are hydrogen or any other radical or group which is inert or undergoes no change in the process. Such groups may be alkyl such as methyl, ethyl, propyl, butyl, and the like; alkylol such as methylol, ethylol and the like; aralkyl such as benzyl; aryl such as phenyl and naphthyl; cycloalkyl such as cyclohexyl; oxyalkyl such as oxy-ethyl; oxy-aryl such as oxyphenyl; or hydroxyl. The groups X, Y and Z may be the same or dissimilar. Illustrative examples of symmetrical triaminobenzene compounds which can be made in accordance with my invention, in addition to those set forth in the specific examples set forth hereinabove, include 1-hexyl-2,4,6-triaminobenzene; 1-propyl-2,4,6-triaminobenzene; 1 - isopropyl - 2,4,6 - triaminobenzene; 1-butyl-2,4,6-triaminobenzene; 1-cyclohexyl-2,4,6-triaminobenzene; 1,3,5-trimethyl-2,4,6-triaminobenzene; 1,3-dimethyl-2,4,6-triaminobenzene; and the like. Such compounds are, of course, intially produced in the form of their acid salts, notably their hydrochlorides, and the free bases recovered therefrom.

In order that those skilled in the art may fully understand the various phases and full scope of the invention, the following examples are set forth for carrying out the procedures and producing various of the compounds described hereinabove. It will be understood, however, that the examples are illustrative and are not to be considered as in any way limitative of the full scope of the invention. Thus, for example, various changes may be made with respect to the concentrations and proportions of reacting materials, temperatures, times of treatment, and the like, which are within the spirit of the invention in light of the guiding principles which are disclosed herein.

*Example I.—Preparation of symmetrical triaminobenzene hydrochlorides*

125 grams of 2,4,6-trinitrobenzoic acid and 360 grams of coarse particles of iron are each divided into 15 equal portions and are added during four and one-half hours, under stirring, to 1400 cc. of concentrated hydrochloric acid so that an excess of iron is always present in the reaction mixture. The temperature is maintained between 70 degrees C. and 80 degrees C. The free acid content (determined by titration to the point at which iron hydroxide began to precipitate) is 5.9 grams per 100 cc. of reaction mixture. Then, 200 cc. of concentrated hydrochloric acid and 25 grams of coarse particles of iron are added and the mixture heated and stirred for ten minutes during which the temperature is allowed to rise to 88 degrees C. Finally, 50 grams of iron are added and the temperature allowed to fall during thirty minutes to 70 degrees C. The free acid content is now 4.67 grams per 100 cc.

The sludge is filtered off and is washed with 425 cc. of water. The free acid of the combined filtrate and washings is 3.5 grams per 100 cc. The solution is stored in an ice chest and then the resulting precipitate is filtered from the chilled solution. The symmetrical triaminobenzene hydrochlorides are triturated with 25 cc. of water, sucked dry, then washed with 100 cc. of ethanol. The yield of symmetrical triaminobenzene hydrochlorides is 77 grams. Typical analyses of this salt show 42.9% and 43.2% chlorine. Symmetrical triaminobenzene trihydrochloride, $C_6H_{12}N_3Cl_3$, contains 45.74% of chlorine, symmetrical triaminobenzene trihydrochloride containing one mol of water has 42.45% chlorine, and symmetrical triaminobenzene dihydrochloride, $C_6H_{11}N_3Cl_2$, contains 35.62% of chlorine.

*Example II.—Preparation of symmetrical triaminobenzene hydrochlorides*

168 grams of symmetrical trinitrobenzene, containing 49% moisture, and 360 grams of ground iron are each divided into 15 equal portions and added alternately with stirring to 1400 cc. of concentrated hydrochloric acid while maintaining an excess of iron at all times in the reaction mixture. The temperature is maintained between 65 degrees and 75 degrees C. The free acid at the end of the period is 5.25 grams per 100 cc. The sludge is filtered off and washed with 425 cc. of water. The combined filtrate and washings show a free acid value of 4.5 grams per 100 cc. When the solution is cooled to about 0 degree C., crystals of symmetrical triaminobenzene hydrochloride form. The yield of symmetrical triaminobenzene hydrochloride obtained by filtration of the mixture is 51 grams.

*Example III.—Preparation of symmetrical triaminobenzene hydrochlorides*

237 grams of damp 2,4,6-trinitrobenzoic acid containing 47% moisture are added portion-wise together with 360 grams of coarsely ground iron, under stirring, to 1400 cc. of commercial concentrated hydrochloric acid during three hours, the additions being made so that an excess of iron is at all times present in the reaction mixture. The mixture is stirred at temperatures between 60 degrees C. and 70 degrees C. for one hour longer, after which time the free acid value is 6.86 grams per 100 cc. Then, 200 cc. of technical hydrochloric acid and 33 grams of coarsely ground iron are added and the mixture is heated, with stirring, to 92 degrees C. during forty minutes, after which 33 grams more of iron are added, and heating is continued for ten minutes at 93 degrees C. Finally, 33 grams more of coarsely ground iron are added, while stirring, and the mixture is allowed to cool to 70 degrees C. The sludge is filtered off and is washed with 450 cc. of water. The combined filtrate and washings show a free acid value of 3.79 grams per 100 cc. The crystals deposited from the cooled solution are filtered off and triturated with 25 cc. of cold water, sucked dry, and then washed with 50 cc. of ethanol. There are obtained 76 grams of symmetrical triaminobenzene hydrochlorides.

*Example IV.—Preparation of symmetrical triaminobenzene sulfate*

221 grams of damp symmetrical trinitrobenzoic acid containing 43.5% moisture and 360 grams of ground iron are each divided into 16 equal parts and added alternately, over a period of four hours, to a mixture of 370 cc. of concentrated sulfuric acid with 1050 cc. of water. The addition of the symmetrical trinitrobenzoic acid and iron is carried out so as to maintain an excess of iron at all times during the reaction, and the temperature is maintained at 60–75 degrees C. The mixture is then heated at 95 degrees C. for one-half hour. It is filtered hot and, upon cooling to about 0 degree C., symmetrical triaminobenzene sulfate crystallizes out.

*Example V.—Preparation of symmetrical triaminobenzene base*

24 grams of white symmetrical triaminobenzene hydrochlorides were added to 10 grams of sodium carbonate and 55 cc. of 20% sodium carbonate under good stirring. This produced a large amount of a white precipitate consisting of symmetrical triaminobenzene and sodium chloride. The precipitate was filtered and then extracted with three 300 cc. portions of boiling acetone. The filtered acetone extracts were concentrated and treated with sufficient chloroform to precipitate out the symmetrical triaminobenzene base, 9 grams of long, slender white needles melting at approximately 84 degrees C. being obtained. This material contained from about 1 to 2 molecules of water of crystallization. It is a new compound and may be denoted at 1:3:5 triaminobenzene hydrate, for example, the monohydrate or the dihydrate depending upon whether there is one or two molecules of water of crystallization present therein. Solution of the crystals in chloroform followed by evaporation of the chloroform and driving off the water of crystallization on a steam bath gave a crystalline residue which melted at approximately 129 degrees C. and which showed no depression in mixed melting point with an analyzed sample of symmetrical triaminobenzene base melting at approximately 129 degrees C.

*Example VI.—Preparation of symmetrical triaminobenzene base*

10 grams of symmetrical triaminobenzene hydrochlorides, dissolved in 100 cc. of water, were treated with 80 cc. of 10% sodium carbonate solution. The solution was extracted with chloroform. The chloroform extract evaporated to dryness gave 3.71 grams of symmetrical triaminobenzene base. Analysis calculated for $C_6H_9N_3$: C, 58.51; H, 7.37; N, 34.12. Found: C, 58.0; H, 7.2; N, 33.2.

*Example VII.—Preparation of triaminotoluene hydrochlorides*

125 grams of 95% trinitrotoluene and 330 grams of ground iron were added portion-wise to 1400 cc. of concentrated hydrochloric acid during four hours at temperatures between 70 degrees C. and 80 degrees C. with violet mechanical stirring, the additions being made so as to maintain an excess of iron at all times in the reaction mixture. At the end of this time, the free acid content of the solution was 9.9 grams per 100 cc. Then 100 grams of ground iron in three equal portions were added during the next hour and one-half while the stirring was continued. The solution was filtered hot and the free acid in the filtrate was found to be 4.8 grams per 100 cc. The sludge was washed with 425 cc. of water, and the washings added to the filtrate. The free acid value of the resulting solution was 4.1 grams per 100 cc. The mixture was stored overnight in a refrigerator and the pale yellow needles which crystallized out were filtered off and washed first with 25 cc. of water and then with 180 cc. of ethanol and dried. The yield was 102 grams (80 per cent of the calculated amount) of triaminotoluene hydrochlorides. The analysis for chlorine indicated that the compound was probably triaminotoluene trihydrochloride monohydrate. Analysis calculated for $C_7H_{14}N_3Cl_3 \cdot H_2O$: Cl, 40.3%. Found: Cl, 40.6%, 41.0%.

*Example VIII.—Preparation of triaminotoluene base*

20 grams of triaminotoluene hydrochlorides, produced as described in Example VII, were stirred into 80 cc. of 20% sodium carbonate. The resulting suspension was filtered and the precipitate was discarded. The filtrate was evaporated to dryness in vacuo. The residue weighed 29 grams. This was extracted three times with 60 cc. portions of acetone. Each extract was concentrated to 10–25 cc. and cooled. The first fraction gave 5.8 grams of M. P. 119–120 degrees C.; the second gave 2.5 grams of M. P. 119–120 degrees C.; and the third fraction gave 0.6 grams of M. P. 120–120 degrees C. This is a yield of 81% of crystalline triaminotoluene. When chloroform (525 cc.) was used instead of acetone in a similar example, the yield was 95%. Analysis calculated for $C_7H_{11}N_3$: C, 61.28%; H, 8.08%; N, 30.63%. Found: C, 61.4%; H, 7.5%; N, 29.8%.

*Example IX.—Preparation of triaminotoluene monohydrochloride*

10 grams of triaminotoluene hydrochlorides, produced as described in Example VII, were treated in the cold with 50 cc. of 10% sodium carbonate solution. The triaminotoluene hydrochlorides went into solution but, on addition of the final amount of sodium carbonate, reprecipitated. The pH of the filtrate was 5.1. The yellow crystals were filtered off and washed with 15 cc. of ice water. The yield was 8.2 grams, and the analysis indicated the salt was chiefly a monohydrochloride.

*Example X.—Preparation of triaminotoluene dihydrochloride*

10 grams of triaminotoluene hydrochlorides, produced in accordance with Example VII, were dissolved in water and ethanol was added to the solution until a precipitate was formed. The latter was filtered off, washed and dried. It consisted essentially of triaminotoluene dihydrochloride, as shown by analysis. Analysis calculated for $C_7H_{13}N_3Cl_2$: Cl, 33.75%. Found: Cl, 33.6%.

*Example XI.—Preparation of symmetrical triaminophenol hydrochloride*

100 grams of picric acid containing 10% of water and 360 grams of iron were each divided into 15 equal portions and were added during four hours to 1400 cc. of concentrated hydrochloric acid at 70–80 degrees C. so that an excess of iron was at all times maintained in the reaction mixture. Then 200 cc. of hydrochloric acid and 100 grams of iron were added and the temperature was raised to 95 degrees C. The mixture was filtered while hot, and 200 cc. of water were added to the filtrate. The free acid of the resulting solution was 8.0 grams per 100 cc. On cooling, triaminophenol hydrochloride crystallized out and was recovered by filtration.

In the light of the foregoing description and specific illustrative examples, it will be seen that the proportion of the symmetrical trinitrobenzene compound, iron and hydrochloric acid or other strong mineral acid are so balanced and the reaction is so carried out that a very considerable excess of acid is always present, at the start of the reaction, as the reaction proceeds, and at the end thereof, to stabilize the symmetrical triaminobenzene compound. Additional quantities of iron and, sometimes, acid are used to bring about the color change, which indicates the disappearance of oxidizing agents in the reaction mixture which tend to destroy the sensitive symmetrical triaminobenzene compounds when not protected by a high degree of acidity.

The utilization of strong acid solutions at the beginning of the reaction is highly advantageous since it enables higher production per unit volume of reaction solution, making the process most economical. In other words, the higher the concentration of the acid used, the more iron and symmetrical trinitrobenzene compound may be processed in a given volume of reaction liquor. Where hydrochloric acid is utilized, I prefer to utilize from about 28% to 37% strength acid, excellent results being obtained with about 30% to 35% strength hydrochloric acid. Where the acid used is relatively more dilute, for example, 20% strength hydrochloric acid, lesser amounts of symmetrical trinitrobenzene compound and iron must be used to insure that the free acid does not fall below 3 grams per 100 cc. The use of a given volume of a dilute acid (as distinguished from the use of the same volume of a concentrated acid) requires that the total quantities of symmetrical trinitrobenzene compound and iron be decreased with the result that the symmetrical triaminobenzene compound-producing capacity of a given unit is decreased.

It will be understood, as indicated hereinabove, that the process is susceptible of certain changes without departing from the spirit and essential teachings disclosed. The reaction, or major portion of the reaction, among the symmetrical trinitrobenzene compound, the strong mineral acid and the iron is preferably carried out at a temperature between about 60 degrees C. and about 90 degrees C. At temperatures appreciably below 60 degrees C., the reaction is relatively slow. At temperatures appreciably in excess of 85 degrees C. in the beginning stages of the reaction, where hydrochloric acid is used, a part of said acid is volatilized and lost from the solution. I prefer to operate in the range of about 75 degrees C. to about 85 degrees C. After the main portion of the reaction has been carried out, however, the temperature may be, and preferably is, raised, for example, to about 92–95 degrees C., for a short period of time to ensure completion of the reaction without any deleterious effects.

The iron is used preferably in the form of small particles. Iron turnings or iron wire is satisfactory but it is preferred to use ground iron of relatively small particle size. The symmetrical trinitrobenzene compounds are preferably handled in a damp condition to minimize the possibility of explosions occurring.

While hydrochloric acid is especially satisfactory for use in the practice of my invention, other strong mineral acids can be utilized provided that they are not strongly oxidizing under the conditions of the reaction, and provided, also, that they will produce the necessary hydrogen ion concentration. Such acids are referred to in the claims as strong mineral acids. Typical examples of such acids are sulfuric acid and hydrobromic acid. In the case of sulfuric acid, since ferrous sulfate is formed in the reaction and, since ferrous sulfate is less soluble than ferrous chloride, it may be necessary that the volumes of the reaction liquors be increased in order to prevent precipitation of ferrous sulfate. It will also be understood that, where acids other than hydrochloric acid are utilized, there may also be slight variations in the optimum conditions of acidity. These, however, will be apparent to those versed in the art in the light of my teachings which are set forth herein.

While the invention has been described in detail in its various phases, it will be understood as indicated hereinabove that the process of reducing the symmetrical trinitrobenzene compounds, as well as other procedures or phases of my invention, are susceptible to various changes without in any manner departing from the spirit and essential teachings disclosed herein. It will be further understood that the scope of my invention is not limited other than is set forth in the claims.

This application is a continuation-in-part of my prior application Serial No. 784,522, filed November 16, 1947, said latter application being a continuation-in-part of my prior applications Serial Nos. 510,649 and 510,650, both filed on November 17, 1943, all of said prior applications having now been abandoned.

What I claim as new and desire to protect by Letters Patent of the United States is:

1. A method of preparing acid salts of symmetrical triaminobenzene compounds which comprises reducing a symmetrical trinitrobenzene compound with a strong mineral acid and particles of iron, an excess of reducing agents being maintained in the reaction mixture throughout the reduction reaction, the major part of the iron being converted to a ferrous salt of said acid, said ferrous salt remaining in solution, and maintaining the free acid content of the reduction solution at not less than about 3 grams per 100 cc. until the reduction is essentially completed, said iron being in excess of 9 mols for each mol of said symmetrical trinitrobenzene compound and said acid being sufficiently in excess of the stoichiometric amount required to react with said iron to effect reduction of said symmetrical trinitrobenzene compound to the symmetrical triaminobenzene compound and to maintain the aforesaid acidity, and recovering the acid salts of said symmetrical triaminobenzene compounds from the reaction mixture.

2. A method of preparing hydrochlorides of symmetrical triaminobenzene compounds which comprises reducing a symmetrical trinitrobenzene compound with hydrochloric acid and particles of iron, an excess of reducing agents being maintained in the reaction mixture throughout the reduction reaction, the major part of the iron being converted to ferrous chloride, said ferrous chloride remaining in solution, and maintaining the free acid content of the reduction solution at not less than about 3 grams per 100 cc. until the reduction is essentially completed, said iron being in excess of 9 mols and said acid being sufficiently in excess of 18 mols for each mol of said symmetrical trinitrobenzene compound whereby to effect reduction of said symmetrical trinitrobenzene compound to the triaminobenzene compound and to maintain the aforesaid acidity, and recovering the hydrochlorides of said symmetrical triaminobenzene compounds from the reaction mixture.

3. A method of preparing 1,3,5-triaminobenzene monohydrate which comprises reducing a symmetrical trinitrobenzene compound selected from the group consisting of symmetrical trinitrobenzene and 2,4,6-trinitrobenzoic acid with hydrochloric acid and particles of iron, an excess of reducing agents being maintained in the reaction mixture throughout the reduction reaction, the major part of the iron being converted to ferrous chloride which remains in solution, and maintaining the free acid content of the reduction solution at not less than about 3 grams per 100 cc. until the reduction is essentially completed, said iron being in excess of 9 mols and said acid being sufficiently in excess of 18 mols for each mol of said symmetrical trinitrobenzene compound whereby to reduce said symmetrical trinitrobenzene compound to 1,3,5-triaminobenzene compound and to maintain the aforesaid acidity, recovering the hydrochlorides of 1,3,5-triaminobenzene, admixing the same with an aqueous solution of a strong alkali to form a precipitate, filtering, extracting the precipitate with a solvent for 1,3,5-triaminobenzene, and recovering crystalline 1,3,5-triaminobenzene from the solvent.

4. A method of preparing symmetrical triaminotoluene hydrochlorides which comprises reducing symmetrical trinitrotoluene with hydrochloric acid and particles of iron, an excess of reducing agents being maintained in the reaction mixture throughout the reduction reaction, the major part of the iron being converted to ferrous chloride which remains in solution, and maintaining the free acid content of the reduction solution at not less than about 3 grams per 100 cc. until the reduction is essentially completed, said iron being in excess of 9 mols and said acid being sufficiently in excess of 18 mols for each mol of the symmetrical trinitrotoluene whereby to reduce said symmetrical trinitrotoluene to symmetrical triaminotoluene and to maintain the aforesaid acidity, and recovering the symmetrical triaminotoluene hydrochlorides from the reaction mixture.

5. A method of preparing symmetrical triaminotoluene hydrochlorides which comprises reacting a mixture of symmetrical trinitrotoluene, hydrochloric acid and particles of iron, an excess of reducing agents being maintained in the reaction mixture throughout the reduction reaction, said reaction being carried out, in the main, at a temperature between about 70 degrees C. and about 90 degrees C., the free acid concentration being maintained at not less than about 3 grams per 100 cc. throughout the reduction reaction, said iron being in excess of 9 mols and said acid being sufficiently in excess of 18 mols for each mol of said symmetrical trinitrotoluene whereby to reduce said symmetrical trinitrotoluene to symmetrical triaminotoluene and to maintain the aforesaid acidity, filtering to remove the solution, and recovering the symmetrical triaminotoluene trihydrochlorides therefrom.

6. A method of preparing symmetrical triaminotoluene hydrochlorides which comprises reacting a mixture of particles of iron, 28%-37% hydrochloric acid, and symmetrical trinitrotoluene, said reactants being present in molal proportions of from 10 to 22 mols of iron and from 30 to 60 mols of hydrochloric acid for each mol of trinitrotoluene, said reaction being carried out throughout while maintaining an excess of reducing agents in the reaction mixture and the major portion of the iron being converted to ferrous chloride which remains in solution, the proportions of the aforesaid reactants being such that the free acid concentration of the reduction mixture is maintained at not less than about 3 grams per 100 cc. whereby hydrolysis of the formed symmetrical triaminobenzene hydrochloride compounds is substantially inhibited, and recovering the symmetrical triaminotoluene hydrochlorides from the reaction mixture.

7. A method of preparing symmetrical triaminobenzene compounds which comprises adding particles of iron gradually to a mixture of a symmetrical triaminobenzene compound and an aqueous solution of a strong mineral acid, and heating to effect reduction of said trinitrobenzene compound, the reduction reaction being carried out throughout while maintaining an excess of reducing agents in the reaction mixture, the iron being present in excess of 9 mols for each mol of said symmetrical trinitrobenzene compound and said acid being sufficiently in excess of the stoichiometric amount required to react with said iron to effect reduction of said trinitrobenzene compound to the corresponding triaminobenzene compound and wherein at least half of the iron used is converted to a ferrous salt of said mineral acid, said ferrous salt remaining in solution, the proportions of the aforesaid reactants being such that the free acid concentration of the reduction mixture is maintained at not less than about 3 grams per 100 cc. whereby hydrolysis of the formed symmetrical triaminobenzene compounds is substantially inhibited, and recovering the symmetrical triaminobenzene compounds from the reaction mixture.

8. A method of preparing symmetrical triaminobenzene hydrochloride compounds which comprises reacting a mixture of particles of iron, 28%-37% hydrochloric acid, and a symmetrical trinitrobenzene compound, the iron being in excess of 9 mols and the hydrochloric acid being present in proportions of 30 to 60 mols for each mol of said symmetrical trinitrobenzene compound whereby to effect reduction of said trinitrobenzene compound to the corresponding triaminobenzene compound and to form a reduction solution containing upwards of 28% of ferrous chloride, the reduction reaction being carried out throughout while maintaining an excess of reducing agents in the reaction mixture, the proportions of the aforesaid reactants being such that the free acid concentration of the reduction mixture is maintained not lower than about 3 grams per 100 cc. whereby hydrolysis of the formed symmetrical triaminobenzene hydrochloride compounds is substantially inhibited, and recovering the symmetrical triaminobenzene hydrochloride compounds from the reaction mixture.

9. A method of preparing 1,3,5-triaminobenzene hydrochlorides which comprises reacting particles of iron with a mixture of 28%-37% hydrochloric acid and a symmetrical trinitrobenzene compound selected from the group consisting of symmetrical trinitrobenzene and 2,4,6-trinitrobenzoic acid and heating to effect reduction of said trinitrobenzene compound, the reduction reaction being carried out throughout while maintaining an excess of reducing agents in the reaction mixture, said reactants being present in molal proportions of from 10 to 22 mols of iron and from 30 to 60 mols of hydrochloric acid for each mol of symmetrical trinitrobenzene compound, the major part of the iron being converted to ferrous chloride which remains in solution, the proportions of the aforesaid reactants being such that the free acid concentration of the reduction mixture is maintained not below 3 grams per 100 cc. whereby hydrolysis of the formed 1,3,5-triaminobenzene hydrochlorides is substantially inhibited, and recovering the 1,3,5-triaminobenzene hydrochlorides from the reaction mixture.

10. In a method of preparing acid salts of symmetrical triaminobenzene compounds, the steps which comprise adding particles of iron gradually to a mixture of an at least 28% aqueous solution of a strong mineral acid and a symmetrical trinitrobenzene compound, heating the mixture for at least an hour at a temperature of about 60 degrees C. to about 95 degrees C., said reactants being present in molal proportions of from 10 to 22 mols of iron and from 30 to 60 mols of said mineral acid for each mol of symmetrical trinitrobenzene compound, said reaction serving to reduce the trinitrobenzene compound to a triaminobenzene compound and convert the major part of the reacted iron to the ferrous salt of said mineral acid which remains in solution, the proportions of the aforesaid reactants being such that the free acid in the reaction mixture is maintained at not less than about 3 grams per 100 cc. until reduction is essentially completed, and recovering the acid salts of the symmetrical triaminobenzene compounds from the reaction mixture.

11. In a method of preparing hydrochlorides of symmetrical triaminobenzene compounds, the steps which comprise reacting a mixture of particles of iron, 28%–37% strength aqueous hydrochloric acid, and a symmetrical trinitrobenzene compound, heating the mixture at a temperature of about 70 degrees C. to about 90 degrees C., said reactants being present in molal proportions of from 10 to 22 mols of iron and from 30 to 60 mols of hydrochloric acid for each mol of symmetrical trinitrobenzene compound, said reaction serving to reduce the trinitrobenzene compound to a triaminobenzene compound and convert the major part of the reacted iron to ferrous chloride which remains in solution, the proportions of the aforesaid reactants being such that the free acid in the reaction mixture is maintained at not less than about 3 grams per 100 cc. until reduction is essentially completed, and recovering the hydrochlorides of the symmetrical triaminobenzene compounds from the reaction mixture.

12. In a method of preparing hydrochlorides of symmetrical triaminobenzene compounds, the steps which comprise adding particles of iron gradually to a mixture of 28%–37% strength aqueous hydrochloric acid and a symmetrical trinitrobenzene compound, heating the mixture for at least an hour at a temperature of about 60 degrees C. to about 95 degrees C., said reactants being present in molal proportions of from 10 to 22 mols of iron and from 30 to 60 mols of hydrochloric acid for each mol of symmetrical trinitrobenzene compound, said reaction serving to reduce the trinitrobenzene compound to a triaminobenzene compound and convert the major part of the reacted iron to ferrous chloride which remains in solution, the proportions of the aforesaid reactants being such that the free acid in the reaction mixture is maintained at not less than about 3 grams per 100 cc. until reduction is essentially completed, and recovering the hydrochlorides of the symmetrical triaminobenzene compounds from the reaction mixture.

13. In a method of preparing hydrochlorides of symmetrical triaminobenzene, the steps which comprise adding particles of iron gradually to a mixture of 28%–37% strength aqueous hydrochloric acid and at least one symmetrical trinitrobenzene compound selected from the group consisting of symmetrical trinitrobenzene and 2,4,6-trinitrobenzoic acid, heating the mixture at a temperature of about 60 degrees C. to about 95 degrees C., said reactants being present in molal proportions of from 10 to 22 mols of iron and from 30 to 60 mols of hydrochloric acid for each mol of symmetrical trinitrobenzene compound, said reaction serving to reduce said trinitrobenzene compound to triaminobenzene compound and convert the major part of the reacted iron to ferrous chloride which remains in solution, the proportions of the aforesaid reactants being such that the free acid in the reaction mixture is maintained at not less than about 3 grams per 100 cc. until reduction is essentially completed, and recovering the hydrochlorides of symmetrical triaminobenzene from the reaction mixture.

14. In a method of preparing hydrochlorides of symmetrical triaminobenzene compounds, the steps which comprise addition of particles of iron to a mixture of 28–37% strength aqueous hydrochloric acid and a symmetrical trinitrobenzene compound, heating the reaction mixture at a free acid of at least 3 grams per 100 cc. at a temperature of approximately 70–95 degrees C., adding additional quantities of iron until the reduction is complete, the iron being in excess of 9 mols and the acid being sufficiently in excess of 18 mols for each mol of the symmetrical trinitrobenzene compound whereby to reduce the symmetrical trinitrobenzene compound to the symmetrical triaminobenzene compound and to maintain the aforesaid acidity and also to enable the reacted iron to be converted to ferrous chloride and to remain in the ferrous state, filtering, and cooling the filtrate to effect crystallization of the hydrochlorides of the symmetrical triaminobenzene compounds.

15. In a method of preparing symmetrical triaminobenzene compounds, the steps which comprise addition of particles of iron to a mixture of 28–37% strength aqueous hydrochloric acid and a symmetrical trinitrobenzene compound, heating the reaction mixture at a free acid of at least 3 grams per 100 cc. at a temperature of approximately 70–95 degrees C., adding additional quantities of iron until the reduction is complete whereupon the color of the reduction solution changes from brown to greenish, the iron being in excess of 9 mols and the acid being sufficiently in excess of 18 mols for each mol of the symmetrical trinitrobenzene compound whereby to reduce the symmetrical trinitrobenzene compound to the symmetrical triaminobenzene compound and to maintain the aforesaid acidity and also to enable the reacted iron to be converted to ferrous chloride and to remain in the ferrous state, and recovering the resulting symmetrical triaminobenzene compound from the reduction solution, said reduction solution containing from about 28% to about 32% ferrous chloride.

16. In a method of preparing hydrochlorides of symmetrical triaminotoluene, the steps which comprise addition of particles of iron to a mixture of 28–37% strength aqueous hydrochloric acid and symmetrical trinitrotoluene, heating the reaction mixture at a free acid of at least 3 grams per 100 cc. at a temperature of approximately 70–95 degrees C., adding additional quantities of iron until the reduction is complete, the iron being in excess of 9 mols and the acid being sufficiently in excess of 18 mols for each mol of the symmetrical trinitrotoluene whereby to reduce the symmetrical trinitrotoluene to symmetrical triaminotoluene and excess of the amounts necessary to reduce the symmetrical trinitrotoluene compound to triaminotoluene and in order to maintain the aforesaid acidity and also to enable the reacted iron to be converted to ferrous chloride and to remain in the ferrous state, and recovering the resulting hydrochlorides of the symmetrical triaminotoluene from the reduction solution.

17. The method of claim 8 wherein the symmetrical trinitrobenzene compound is picric acid and the symmetrical triaminobenzene compound produced is triaminophenol.

18. Crystalline 1,3,5-triaminobenzene containing from about 1 to 2 molecules of water of crystallization, and having a melting point of about 84 degrees C.–86 degrees C.

19. As a new compound, 1:3:5 triaminobenzene monohydrate.

References Cited in the file of this patent

UNITED STATES PATENTS

| Number | Name | Date |
| --- | --- | --- |
| 1,492,094 | Beilouss | Apr. 29, 1924 |
| 1,845,759 | Miller et al. | Feb. 16, 1932 |

(Other references on following page)

UNITED STATES PATENTS

| Number | Name | Date |
|---|---|---|
| 2,461,498 | Krueger | Feb. 8, 1949 |
| 2,501,907 | McLean et al. | Mar. 28, 1950 |

FOREIGN PATENTS

| Number | Country | Date |
|---|---|---|
| 102,358 | Germany | Mar. 8, 1899 |
| 166,934 | Great Britain | July 25, 1924 |

OTHER REFERENCES

Mahood et al., "Org. Synthesis" Collective (1943), vol. II, pp. 160–2.

Mahood et al., "Org. Synthesis" (1931), vol. XI, pp. 32–3.

Beilstein, "Handbuch der Org. Chemie" (1930), vol. XIII, p. 299.

Hein et al., "Berichte" (1935), vol. 68, pp. 856–63.

Clarke et al., "Organic Synthesis" (1929), vol. IX, pp. 74–6.